5845X
PATENTED FEB. 23, 1830.
I. WILLSON.
MILL FOR GRINDING CORN.
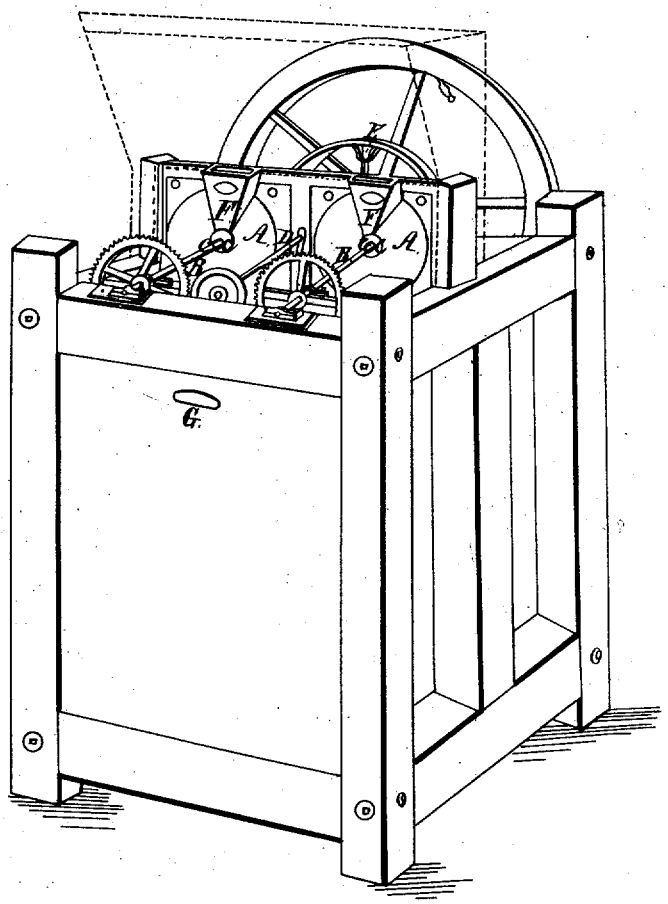

Feb 23, 1830 5845X 135

Increase Wilson of New London, Connecticut
Letters Patent

The schedule referred to in these Letters Patent and making part of the same containing a description in the words of the — Increase Wilson himself of his improvement in mills for grinding Corn and other substances, To all to whom these presents shall come, Be it known that I Increase Wilson of the Town of New London, in the County of New London & State of Connecticut have invented a new and useful improvement in Mills for grinding Corn & other substances & that the following is a full and exact description of the construction and operation of the said Machine as improved by me, The improvement consists first in connecting two or more cast iron mills (or the grinding parts thereof) together by means of several cast iron spur or bevel wheels, with Iron shafts, and coupling boxes or clutches so that by turning one shaft, one or more of said Mills are put in operation & one or all of them readily disengaged by sliding the coupling box attached to each Mill. (the Object being to enable a person to apply to advantage, whatever power he may desire, to drive, the Mills. which in the ordinary way with only one Mill he could not do so conveniently) There is also another advantage in having two or more small mills instead of one large Mill to grind equally fast, that true small castings may be easily obtained while those of a large size are apt to ~~warp~~ or spring in casting & small castings are generally harder than large ones) The improvement further consists in the construction of the Hopper, which is made in two parts, the main or upper part of wood & so constructed as to slip on and off at pleasure, The lower part of the hopper is cast iron and screwed to a center board [illegible] the Drawing in the Portfolio

5845X mills both part of the hopper may be made of sheet iron or tin)
the accompanying & annexed drawing marked A. represents the
improvement in Mills for grinding Corn and other substances (with two
connected together by hoppers) [illegible] the two mills, grinding parts
Mills or grinding parts, (of cast iron) confined in a board which is
secured across the centre of a frame, one end of each of the inside
grinders passing thro' the centre of each of the outside grinders and
connected with shafts (marked B.B.) by two iron coupling boxes
(marked C C) which are made to slide on the shafts so as to dis
-engage one or both mills at pleasure; to the shafts are secured
two spur wheels to gear into one of about half their size (as appears
by the drawing) which is secured on the main shaft (marked D.)
on the main shaft, (which passes through the centre board) a cast
iron pulley is secured (marked E) to which is applied a belt
to move the Mill, on the end of the same shaft is a fly wheel
into which a handle is placed, when it may be desirable to
work the Mill by hand —

The stationary or lower parts of the Hoppers marked F.F.
The main Hopper is represented by the dotted lines, has two outlets
directly over the stationary or lower parts of the hoppers (F.F.)
to pass the corn or other substance into the mill supported by
means of a groove cut into each end of the main hopper, so as
to slide down the centre parts as far as the upper railing of
the frame, A box or drawer to slide out and into the frame
to receive the Meal is represented on the drawing (marked G.)

Increase Wilson.

Witnesses
Wm. P. Cleaveland
Francis G. Turner 25
ch'fd.

648 [illegible]